No. 738,272. PATENTED SEPT. 8, 1903.
J. H. AUBLE.
AGRICULTURAL IMPLEMENT.
APPLICATION FILED DEC. 31, 1902.
NO MODEL. 2 SHEETS—SHEET 1.
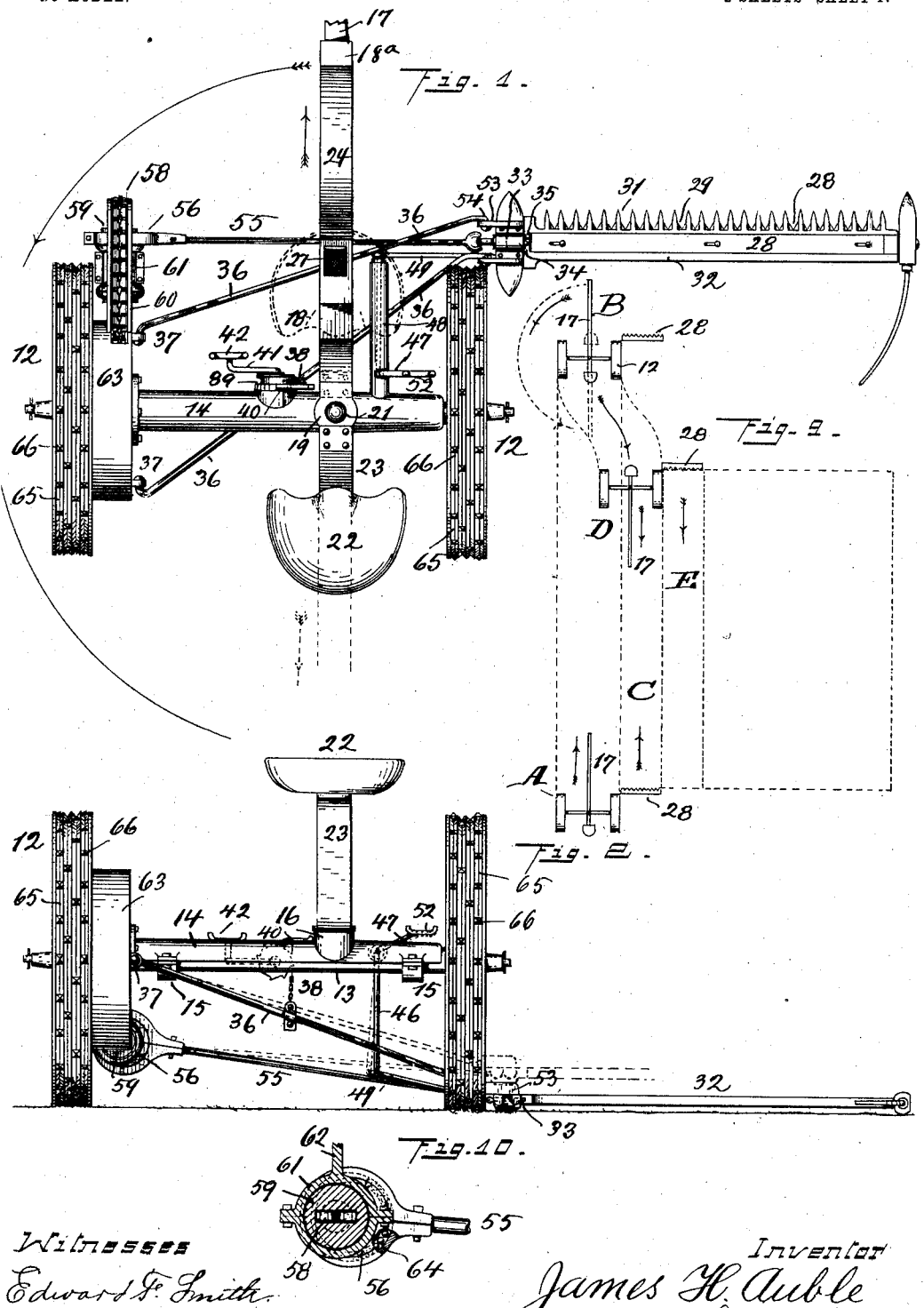
Witnesses
Edward F. Smith
Arthur Kline
Inventor
James H. Auble
by C. Spengel Atty.

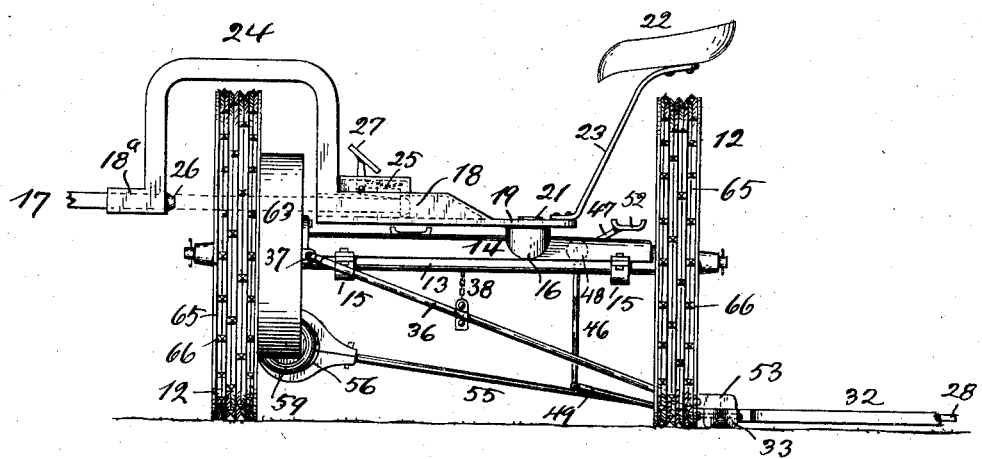
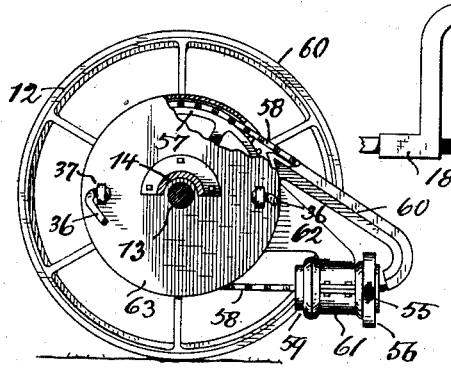
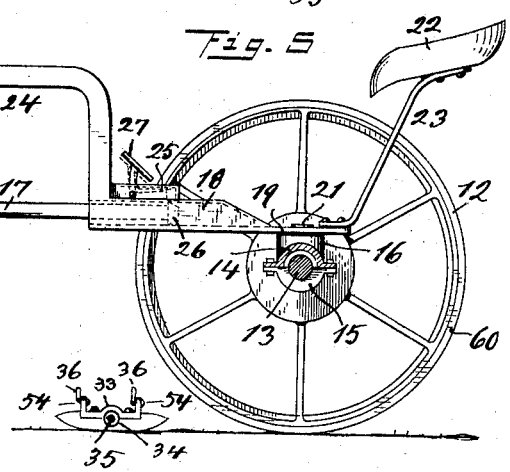
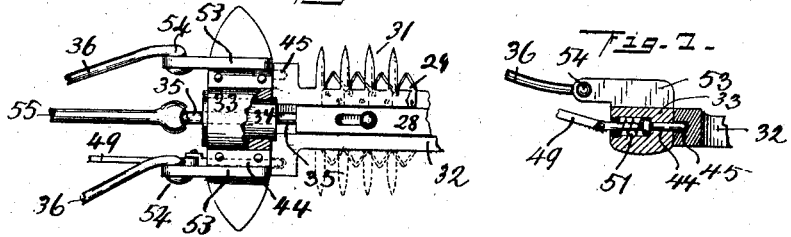
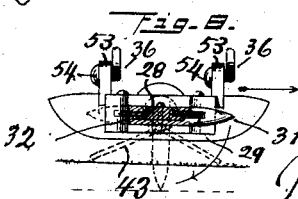

No. 738,272. Patented September 8, 1903.

UNITED STATES PATENT OFFICE.

JAMES H. AUBLE, OF CINCINNATI, OHIO, ASSIGNOR OF ONE-HALF TO JAMES J. McDONALD, OF CINCINNATI, OHIO.

AGRICULTURAL IMPLEMENT.

SPECIFICATION forming part of Letters Patent No. 738,272, dated September 8, 1903.

Application filed December 31, 1902. Serial No. 137,240. (No model.)

*To all whom it may concern:*

Be it known that I, JAMES H. AUBLE, a citizen of the United States, residing in the city of Cincinnati, in the county of Hamilton and State of Ohio, have invented certain new and useful Improvements in Agricultural Implements; and I do declare the following to be a clear, full, and exact description thereof, attention being called to the accompanying two sheets of drawings, with the reference characters marked thereon, which form also a part of this specification.

This invention relates to improvements in agricultural implements of the kind where an organized working mechanism operated for a certain purpose, as for seeding or for harvesting by digging or by cutting grass or grain, is carried on wheels back and forth over the ground for the purpose of doing this particular work, the operation of said mechanism being usually derived from the rotation of the carrying-wheels, while the implement as a whole is moved generally by draft-animals.

The features of my invention are particularly well adapted for implements like mowers, reapers, and harvesters, where a reciprocatory sickle-bar is used to cut the halm, and therefore I have shown and described my invention in connection with such a machine. These machines are quite heavy, and it is essential to move them over the ground in the most advantageous manner, so as to avoid in their manipulations all unnecessary turns and movements.

The leading feature of my invention is therefore a certain construction as shown and described and whereby turns of the machine are altogether avoided—that is to say, the machine in its entirety does not require to be turned at all, thus obviating the handling of its weight for such purpose by the draft-animals. This is of particular advantage where a field is hilly or lies inclined. This feature of my invention concerns, therefore, more particularly those parts of the implement whereby it is carried and whereby its operating parts are supported and actuated.

The other feature of my invention concerns the operating parts themselves and which are constructed in a manner to properly operate in view of the particular construction and arrangement of the parts first referred to and whereby they are supported and actuated.

In the following specification and particularly pointed out in the claims is found a full description of the invention, together with its operation, parts, and construction, which latter is also illustrated in the accompanying two sheets of drawings, in which—

Figure 1 shows a top view of the principal parts of a halm-cutting agricultural implement, which may be a mower, reaper, or harvester. Fig. 2 is a rear view of the same. Fig. 3 is a similar view with parts of it in the act of being turned. Figs. 4 and 5 are opposite side views resulting from a vertical cross-section of the machine. Fig. 6 is an enlarged detail view of one end of the sickle-bar, showing manner of its connection. Fig. 7 is a similar view showing in section means for locking it in position after adjusted. Fig. 8 is a cross-section of the same. Fig. 9 shows in a diagram a plan for manipulating the implement over a field. Fig. 10 is a sectional detail view of the means for rotating the eccentric which operates the sickle-bar. Fig. 11 is a horizontal section of the preceding figure.

In the drawings, 12 represents the wheels on which the implement is carried, they being mounted upon an axle 13, with which they constitute the running-gear, the particular details and connection of which mounting are not essential nor new in this connection. By preference this mounting is in the manner customary in such machines—that is, by suitable means, usually pawl-and-ratchet or clutch devices. Wheels and axle are locked together only when the implement is used for working, so that when it is merely moved to and from the work the axle which usually serves as a means to actuate the operating devices does not receive, and therefore not transmit, any motion. Supported on this axle there is a suitable frame, described below, to which are connected parts of the working mechanism, the means to operate and manipulate it, and the driver's seat and the hitching-gear whereby the draft-animals are attached to the outfit. This frame consists in this case of a semitubular structure 14, held in place by bearings 15, which are fitted to the axle in a manner to leave the same free for rotation. Between its ends this frame is provided with a boss 16, to which is pivotally attached the hitching-gear, being the tongue 17 and its socket 18, which receives the rear end of the former. The pivotal attachment to frame 14 is by means of a lug 19 and a pin 21, passing through it into boss 16. 22 is the driver's seat, connected to the hitching-gear or tongue so as to share in any pivotal movement of the same. Its supporting-bracket 23 is for such purpose attached to lug 19. The object of this pivotal attachment of the hitching-gear to the running-gear—that is, to wheels and axle—is to enable the driver while occupying his seat to walk the draft-animals without detaching them around the running-gear, so as to face in opposite direction, permitting after that a movement of the entire outfit in such direction without turning the implement itself. This presumes that the size of the wheels with reference to the height at which the tongue is supported is such that this latter clears the former by passing above them. Where these conditions do not exist and in order to avoid excessive elevation of the seat and tongue, an arrangement is required whereby the tongue clears the wheel without being detached from connection with the running-gear. For such purpose there is a supplementary socket $18^a$, arranged to be in line with the other socket 18 and supported so as to leave a space between their opposite ends which is sufficient to pass the wheel, as best shown in Fig. 3. This manner of support is accomplished by a neck 24, curved upwardly and connecting to these opposite ends of the sockets. Normally the end of the tongue is held in rear socket 18 by any suitable catch device—as, for instance, by a pawl 25, engaging a shoulder 26 and which may be disconnected by a treadle device 27, manipulated by the driver with his foot. Suitable means may be provided which at that time connect the rear end of the tongue to frame 14 to prevent independent lateral movement and to permit guiding of the machine. These means may consist of two perforated lugs $16^a$, projecting diametrically from boss 16 and register with a perforation in member 19 when the hitching-gear is in either one of its operative positions with reference to the running-gear, so that by insertion of a pin $16^b$ the parts may be held in such position. When the draft-animals are turned about the running-gear, this pin is temporarily removed, as shown in Fig. 3. Thus after arriving at the end of a row and desiring to return the driver detaches the tongue and by slightly urging the draft-animals onward he causes the end of the tongue to leave its socket 18 and pass into socket $18^a$, as shown in Fig. 3. The end of the tongue cannot leave this latter socket by reason of its size, being arranged so that shoulder 26 cannot clear it. The draft-animals are now walked around the side of the implement until facing the other way, as shown by the arrow and dotted lines in Fig. 1, after which they are backed, so that the rear end of the tongue slides again into its socket 18, where it is reëngaged and held by pawl 25. Finally, locking-pin $16^b$ is dropped through member 19 into one of lugs $16^a$, whereby the hitching-gear is locked to the running-gear for the purpose of guiding this latter. It will be seen that this implement may now be returned—that is, advanced in opposite direction—without its running-gear having been turned. Attention is called to the fact that during ordinary use there is no strain on the curved part of neck 24, since the tongue is held by pawl 25, and whatever strain exists is very limited, since it occurs only while the hitching-gear is turned on the running-gear, such being its only function. It is furthermore merely in a lateral direction. To completely convert the condition of the implement for operation in this reverse direction, it becomes further necessary to also adjust the working devices operated from the running-gear and the mechanism whereby such operation is accomplished, so that they also work while being carried by the running-gear in such opposite direction. In the case under consideration, the implement being one for cutting halm, a sickle-bar 28 is used, the knives 29 of which operate in conjunction with fingers 31 of a finger-bar 32, the former being reciprocated with reference to this latter in the manner customary in agricultural implements of this class. Now in order to cause this cutting outfit to also operate in reversed direction knives 29 and fingers 31 are arranged so as to be reversible. For such purpose I provide a bearing 33, being substantially like a shaft-box, into which a journal 34 at the inner end of finger-bar 32 is fitted, so as to be capable of turning therein. This journal is bored to receive the inner end 35 of the knife-bar and permits operative connection to be made on the other side for purpose of its actuation. To permit such reversal of the sickle-bar, it is further necessary that it be somewhat lifted to clear the ground sufficiently for the purpose. This is done by supporting bearing 33 on a suitable framework, which may consist of links or braces 36 and which frame is pivotally attached at 37 to parts carried by the running-gear—as, for instance, to frame 14 or to members forming parts thereof. This pivotal attachment permits now the raising of bearing 33, together with the sickle-bar attached to it, which raising may be by any suitable mechanism attaching to it or to frame 36. As shown, I use a chain 38, attached to frame 36 and to a drum 39, supported on frame 14, and which drum may be partially turned by a lever 41, depressed by a treadle 42. Not much elevation is required. In fact, the points of the fingers 31 are left in contact with the ground, as shown in dotted lines in Fig. 8, so that by a slight move in the proper direction of the implement by means of the draft-animals the reversal is readily accomplished, aided by the momentum of this movement and said contact with the ground. These lifting means are also used when it becomes necessary for the sickle-bar to clear obstructions—like, for instance, a stone or stump—in which case, however, the movement is more extended, so as to raise the sickle-bar sufficiently high. It may be held elevated by a suitable pawl-and-ratchet device 40. Means are required to lock the reversible sickle-bar in position after every turn, for which purpose I provide a locking-pin 44, carried in bearing 33 and adapted to enter into either one of two sockets 45 in the laterally-extended end of the sickle-bar. Previous to reversal this pin is withdrawn by suitable mechanism, consisting of levers 46 and 47, projecting from a rock-shaft supported in a bearing 48, extending from frame 14. Lever 46 connects to pin 44 by means of a link 49, while a spring 51 keeps this pin normally in engagement with either one of the sockets 45. A treadle 52 is at the end of the other lever 47, whereby this movement is manipulated. There is also a pivotal connection between the sickle-bar and its supporting-frame 36, the object being to obtain a joint which permits the sickle-bar of being turned up when not used, as in going to or from a field. This is obtained by lugs 53 on bearing 33, to which the ends of braces 36 are hingedly connected, as shown at 54. The operative connection to the inner end 35 of the sickle-bar is accordingly by a knuckle-joint. The knife-bar may be reciprocated by any suitable mechanism operating through the medium of a connecting-rod 55, attached by the knuckle-joint above mentioned and actuated by a crank movement or, as shown, by an eccentric 56. This latter may be rotated from axle 13 by any mechanical means or transmitting-gear, the axle, as previously stated, receiving its rotation from the driving-wheels of the running-gear. As shown, I use a sprocket-wheel 57 on the axle, the chain 58 of which may actuate other suitable machine elements, or I may use a movement invented by me and described in Patents Nos. 627,467 and 627,468, where said chain is used to rotate a nut by being drawn through the same. This nut (designated by 59 in Figs. 10 and 11) has spirally-arranged grooves 67, occupied by rollers 68, carried at opposite edges of this chain 58 and which rollers by being drawn through these grooves in the bore of the nut 59 cause the same to rotate within bearings 61. A guide 60 guides this chain into said nut. Eccentric 56 is mounted at one end of this nut, where it projects beyond its bearing 61. This latter is supported on a bracket 62, projecting from main frame 14 or from a shell 63, attached to said frame and provided to cover the sprocket-wheel. This shell also affords the means for attaching the pivotal connection 37 of frame 36, which supports the sickle-bar. To reduce the friction between the strap surrounding eccentric 56, I introduce antifriction-balls 64, forming a roller-bearing, as shown in Fig. 10.

The faces of the driving-wheels are shaped as shown—that is, they are provided with V-shaped grooves 65, having teeth 66 projecting from within them, the object being to obtain a secure traction engagement while passing over the ground. These grooves and teeth are pressed in an independent sheet-metal rim 60. In the diagram in Fig. 9 I have illustrated the use of my implement, showing plainly the advantages resulting from the improvements imparted. The implement from the position A has been advanced to the position B, the sickle-bar cutting through the strip C. The implement is left standing in this position, the animals are walked around it, the tongue turning on the running-gear, which remains stationary, after which the whole advances to the position D and is moved again toward the other end, cutting now the strip E, the sickle-bar having of course been previously attended to. Arrived at the other end of this strip E the same manipulation is repeated, so that, as may be seen, the entire field may be traversed back and forth without requiring a single turn of the implement.

Having described my invention, I claim as new—

1. In a halm-cutting agricultural implement, the combination of a running-gear, a sickle-bar and mechanism for actuating it, both carried and operated by the running-gear, the sickle-bar being attached so as to be free to be rotated about its longitudinal axis to permit cutting in both directions with reference to the direction of travel of the running-gear.

2. In a halm-cutting agricultural implement, the combination of a running-gear, a sickle-bar and mechanism for actuating it, both carried and operated by the running-gear, the sickle-bar being attached so as to be free to be rotated about its longitudinal axis to permit cutting in both directions with reference to the direction of travel of the running-gear and a hitching-gear attached to the running-gear in a manner permitting it to be moved about the implement independent of the running-gear.

3. In a halm-cutting agricultural implement, the combination of a running-gear, a sickle-bar and mechanism for actuating it, both carried and operated by the running-gear, the sickle-bar being attached so as to be free to be rotated about its longitudinal axis to permit cutting in either direction.

4. In a halm-cutting agricultural implement, the combination of a running-gear, a sickle-bar and mechanism for actuating it, both carried and operated by the running-gear, a frame whereby the sickle-bar is connected to the running-gear and a bearing in which the sickle-bar may be turned about its longitudinal axis and whereby it is attached to this frame in a manner to be reversible thereon.

5. In a halm-cutting agricultural implement, the combination of a running-gear, a sickle-bar and mechanism for actuating it, both carried and operated by the running-gear, a frame whereby the sickle-bar is connected to the running-gear, a bearing in which the sickle-bar may be turned about its longitudinal axis and whereby it is attached to this frame in a manner to be reversible thereon so as to be capable of cutting while moving in either one of opposite directions of the travel of the implement and means to lock the sickle-bar in either position.

6. In an implement of the kind herein view, the combination of a working device, mechanism for operating it, a running-gear whereby both are carried, a tongue and two alined sockets for it with a space between them and either one of which sockets the end of the tongue may occupy, said sockets contained in a connected structure which is pivotally attached to the running-gear.

In testimony whereof I hereunto set my signature in the presence of two witnesses.

JAMES H. AUBLE.

Witnesses:
C. SPENGEL,
ARTHUR KLINE.